April 18, 1950      M. DE MARTINO      2,504,114

AIRCRAFT FLIGHT INDICATOR

Filed Sept. 21, 1945

*Inventor*
MARIUS DE MARTINO

By Ralph L. Chappell
*Attorney*

Patented Apr. 18, 1950

2,504,114

UNITED STATES PATENT OFFICE 2,504,114

AIRCRAFT FLIGHT INDICATOR

Marius De Martino, United States Coast Guard

Application September 21, 1945, Serial No. 617,892

1 Claim. (Cl. 116—124)

(Granted under the act of March 3, 1883, as amended April 30, 1928; 370 O. G. 757)

This invention relates to flight or attitude indicating instruments for aircraft and more particularly to improvements therein for simplifying the pilot's reaction to the indications shown.

Heretofore it has been difficult for the pilot of an aircraft, especially when either learning to fly or under strain or fatigue, to readily determine from the flight indicator the true condition of the airplane with respect to the horizon. Gyroscopic operated attitude indicating instruments of this character have an indicating member which at all times maintains a parallel relationship with the actual horizon and a second indicating member, usually shaped to simulate an airplane, fixed to the plane and thereby moving with it. These two members are viewed together by the pilot and relative displacement of one with respect to the other shows the true condition or attitude of the plane in space. Intense application or fatigue has caused pilots to become victims of a reversal of perception and imagine the gyro controlled member inclining rather than the airplane in relation to the true horizon. As a result, instead of correcting the attitude of the plane, the pilot operates controls which accentuate the improper condition of the plane, with the ultimate possibility of causing the plane to spiral down or in emergency situations to crash or strike nearby objects.

An important object of this invention is to provide an attitude indicator which considerably reduces if not completely eliminates misinterpretations of this character and at the same time imposes less strain on the pilot. The invention resides in providing indicating members so contrastingly colored that when viewed non-overlapping portions are sharply distinguished one from the other. This is accomplished by forming the indicating members of transparent or light permeable material having distinctly different color characteristics and mounting the same for view before a lighted background. One of the colored transparent members is associated with the gyroscope, the other with the instrument so that it partakes of the movement of the plane. The transparent members are mounted one behind the other and in normal level flight act to neutralize the light passed therethrough from the lighted background, but any deviation from normal level flight causes relative displacement of one member with respect to the other which is readily seen and properly interpreted by the distinct color differentiation. Another important object of this invention is to provide such improvements to flight indicators which do not require any major modification of present equipment and which are economical to produce and install.

Various other objects, advantages and meritorious features of the invention will become more fully apparent from the following description, appended claim and accompanying drawings wherein:

Figure 1:
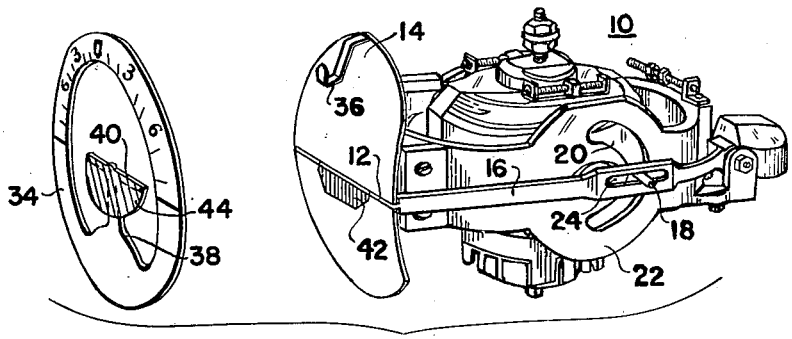
Figure 1 is a perspective view of the operating mechanism of a flight indicator showing the adaption of the invention thereto, two parts of the mechanism being spaced slightly apart for purposes of clarity.

In the illustrated embodiment of the invention, the invention is shown adapted for a flight indicator but it is understood the invention is applicable to other similar aircraft instruments. In the drawings the gyroscope of a flight indicator is generally indicated at 10 in Fig. 1. Since this mechanism is standard apparatus only generally reference will be made thereto. A small horizontal bar 12 simulating the natural horizon is used to show any deviation of the airplane either laterally or longitudinally. This bar extends across the face of a plate 14 slightly curved in a vertical direction to allow freedom of movement of the bar thereover. One end of the bar 12 is operatively connected to an arm 16 which extends perpendicularly therefrom and alongside the gyro. This arm in turn is actuated by a pin 18 protruding from the gyro case through an arcuate slot 20 in the gimbal ring 22 into a longitudinal slot 24 in the arm, as is well understood in the art.

Figure 2:
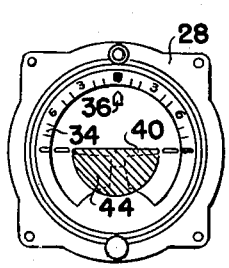
Figure 2 is a front view of the indicating dial.
Figure 3:
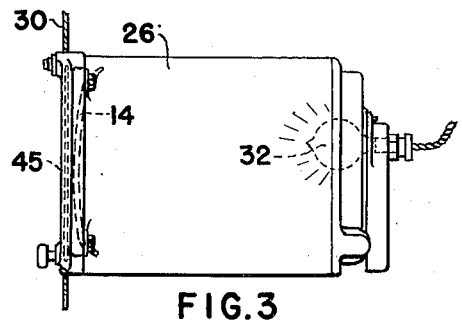
Figure 3 is a side elevation of the housing for the instrument showing location thereof on the instrument panel board of an airplane.

The whole gyro instrument is housed within a casing 26 illustrated in Fig. 3. This casing is normally mounted in an airplane with the front face 28 (Fig. 2) substantially flush with the instruments panel board shown in cross section in Fig. 3 at 30. A source of light generally indicated at 32 is provided in the casing and light therefrom is caused to be reflected upon the curved plate 14 to form a lighted background. As is customary, the front face of the instrument is glass covered as shown. Carried by the casing under the glass protected front is a ring-shaped element 34 having indicia in degrees from zero at the top to 90° on both sides thereof. The markings are swept by a pointer 36 projecting from plate 14 and indicate the degree of lateral inclination of the airplane to the true horizontal. Projecting upwardly centrally of the ring-shaped element and forming a part thereof is a T-shaped indicator 38 carrying a bar 40 simulating an aircraft which is disposed diametrically across the center of the instrument.

The parts herein above referred to in the drawings are well known in flight indicators of this character. The horizon bar 12 and the simulated aircraft 40 have heretofore been colored white. In operation the bar 12, controlled by the gyro, maintains a substantially parallel relation with the natural horizon. The indicator 40 is fixed to the casing and the airplane for movement therewith. In flight, relative movement of the bar with respect to the indicator 40 is used to show any deviation of the airplane either laterally or longitudinally. A pilot viewing the instrument thus far described knows he is in level flight when the miniature airplane 40 exactly overlies the bar 12. When he banks the airplane, it appears to him that the horizon bar moves while the T-shaped indicator 40 appears level, since the T or miniature airplane always maintains the same relative position to him. The pilot must therefore realize or be aware at all times that the horizon bar 12 remains in a fixed position relative to the actual horizon and that the T-shaped indicator 40 with the plane are revolving around it. Intense application or straying of the mind, or sudden emergency situations, may cause the pilot to become the victim of a reversal of perception and imagine the horizon bar 12 tilting rather than the plane in relation to the actual horizon. In this condition, if he is making a turn to the right he sees the horizon bar tilted to the left and attempts to level it with respect to the top of the T indicaor 40 by lowering his righ wing, and he may ultimately spiral down.

To obviate or eliminate the chances of this mistaken conception, and at the same time to impose less strain on the pilot, it is the purpose of this invention to provide positive, distinct indicating means in the form of transparent colored members which will enable the pilot to tell at a glance the attitude of his plane. Referring specifically to the drawings, the horizon bar 12 is provided with a colored transparent member 42 arranged thereon with the top edge flush with the top of the bar. This member is preferably colored red and may be in any suitable shape such as with the bottom edge rounded like the long side of an oval or formed with straight edges as shown. Carried on the T-shaped indicator 40 is a member 44 of comparable transparency characteristics to member 42 and as evident is adapted to overlie the latter. Member 44 is colored in sharp contrast to member 42 and if the latter is red the former is preferably green. Member 44 should be shaped to completely overlie the red member when the plane is in normal level flight. Member 44 is preferably semi-circular in shape as shown with the diameter equal to the maximum dimension of member 42 and mounted with the straight edge flush with the top of the T-shaped indicator 40. The two colored members should be mounted as close to each other to reduce parallax as will permit free movement of the horizon bar 12.

Figure 4:
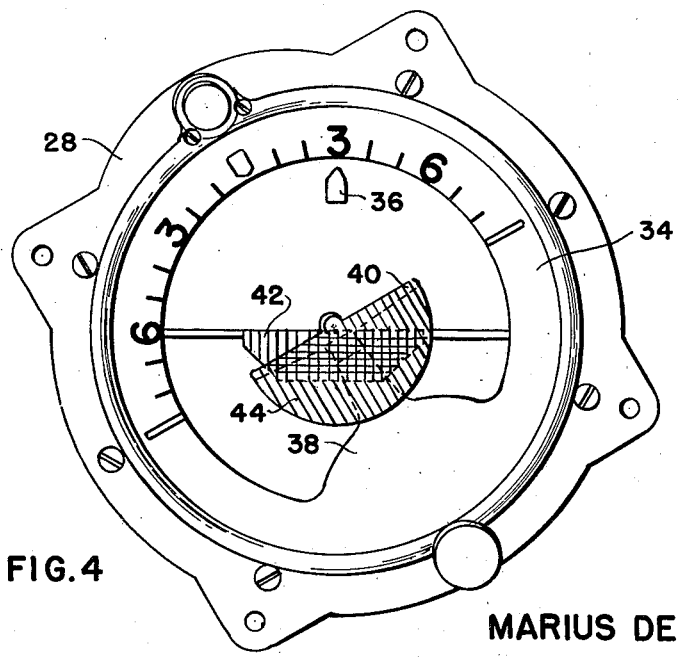
Figure 4 is enlarged view of the indicating dial illustrating the operation of the colored members when the plane is not in level flight.

The flight indicator as modified in accordance with this invention operates as follows: The colored transparent members 42 and 44 are viewed against the lighted background formed by the curved plate 14. As a result of color contrast any portion of the red colored member 42 which is overlapped by the green member forms a dark or black silhouette on the lighted background. Any portions of the members not overlapping, are sharply contrasted with one another. The red member 42 fixed to the gyro horizon bar tends to remain rigid in space and parallel to the true horizon. As the plane moves with respect to the horizon, the T-shaped indicator 38 and the green transparent member attached thereto moves with respect to the horizon bar. In horizontal flight when either plane wing goes down the green member moves as part of the plane uncovering a portion of the red member. If for example the left wing dips, the green member uncovers a portion of the red member and a red sector becomes visible on the left which will be proportional to the degree that the left wing is below the horizon. This condition is illustrated in Fig. 4 and the pointer 36 indicates the degree of bank. Conversely, if the right wing goes down a red sector will be uncovered on the right side. Further, when the airplane is in a nose-down attitude and both wings are horizontal, a red sector of member 42 will appear above the black silhouette and along its entire length in proportion to the degree of nose depression. Similarly, in a nose-up attitude, a green section of member 44 will show above the black silhouette, though below the horizontal center-line of the instrument.

It is thus seen that the present invention simplifies the pilot's reaction to the indication shown. There is no need to interpret which is the horizon line and which is the line of his wings. When the red sector shows on his right it means his right wing is down, and in order to correct it, the red area must be closed. In the event wrong controls are applied, the pilot will be immediately advised because the red sector increases instead of closing. This procedure follows through with other attitudes of the plane. In addition, since red also indicates a nose-down or descending attitude this color will be associated with "down"; in a similar manner the green will be associated with "up."

As previously mentioned, other contrasting colors may be used. Although colored plastic sheet material is preferred for the members 42 and 44, it is understood that other material employing different light permeable characteristics may be used. It is also understood that the transparent colored members may be mounted differently from that illustrated in the drawings to accomplish the object of this invention.

While I have described the preferred form of my invention I do not wish to limit myself to the precise details as shown but wish to avail myself of such variations and modifications as may come within the scope of the appended claim.

The invention described herein may be manufactured and used by or for the Government of the United States of America for governmental purposes without the payment of any royalties thereon or therefor.

I claim:

In a gyroscopically controlled attitude indicator for aircraft, the combination of a casing adapted to be mounted in an aircraft, gyroscopic means mounted in said casing, a horizon bar attached to said gyroscopic means for indicating an artificial horizon, an indicating bar fixed to said casing and oriented relative to the aircraft whereby said indicating bar is movable with the aircraft relative to the horizon bar for indicating the attitude of the aircraft, a source of illumination secured to said casing, translucent means fixed to said casing and interposed between said bars and source of illumination whereby the latter impinges upon said translucent means thereby forming a lighted background against which said bars are viewed, a first colored transparent member carried by said horizon bar, a second colored transparent semi-circular member carried by said indicating bar with the latter in register with the diametric edge of the former, said second member completely overlying the said first member and concealing the same from view when the aircraft is in normal level flight but exposing portions of said first member to view beyond the diametric edge of said semi-circular member when the aircraft deviates from normal level flight, said transparent members being of complementary colors whereby when the lighted background is viewed through overlying portions of the members a dark silhouette is formed but when the lighted background is viewed through non-overlying portions of said members a sharp color contrast is formed.

MARIUS DE MARTINO.

REFERENCES CITED

The following references are of record in the file of this patent:

UNITED STATES PATENTS

| Number | Name | Date |
|---|---|---|
| 1,629,680 | Cooke | May 24, 1927 |
| 1,836,881 | Sperry | Dec. 15, 1931 |
| 1,903,911 | Meador | Apr. 18, 1933 |
| 1,929,668 | Goldsborough | Oct. 10, 1933 |
| 1,982,636 | Carlson | Dec. 4, 1934 |
| 2,255,188 | Riepes | Sept. 9, 1941 |

FOREIGN PATENTS

| Number | Country | Date |
|---|---|---|
| 791,315 | France | Sept. 23, 1935 |